United States Patent
Wang et al.

(10) Patent No.: US 10,409,949 B2
(45) Date of Patent: Sep. 10, 2019

(54) METHOD OF MODELLING AT LEAST A PART OF A GAS TURBINE ENGINE

(71) Applicant: ROLLS-ROYCE PLC, London (GB)

(72) Inventors: Feng Wang, London (GB); Luca Di Mare, London (GB)

(73) Assignee: ROLLS-ROYCE plc, London (GB)

( * ) Notice: Subject to any disclaimer, the term of this patent is extended or adjusted under 35 U.S.C. 154(b) by 633 days.

(21) Appl. No.: 15/065,462

(22) Filed: Mar. 9, 2016

(65) Prior Publication Data
US 2016/0283646 A1   Sep. 29, 2016

(30) Foreign Application Priority Data

Mar. 24, 2015 (GB) .................... 1504921.6

(51) Int. Cl.
*G06F 17/50* (2006.01)

(52) U.S. Cl.
CPC ...... *G06F 17/5086* (2013.01); *G06F 17/5068* (2013.01); *G06F 17/5095* (2013.01); *G06F 2217/16* (2013.01)

(58) Field of Classification Search
None
See application file for complete search history.

(56) References Cited

U.S. PATENT DOCUMENTS

| 2002/0029138 A1* | 3/2002 | Rohl | G06F 17/5018 703/22 |
| 2002/0177985 A1 | 11/2002 | Kraft et al. | |
| 2005/0159936 A1* | 7/2005 | Rees | G06F 17/50 703/6 |
| 2008/0247636 A1* | 10/2008 | Davis | G06T 19/00 382/152 |
| 2015/0227657 A1* | 8/2015 | Dye | G06F 17/5018 703/1 |

OTHER PUBLICATIONS

Di Mare, Luca, et al. "Virtual gas turbines: Geometry and conceptual description." ASME 2011 Turbo Expo: Turbine Technical Conference and Exposition. American Society of Mechanical Engineers, 2011. (Year: 2011).*

Farrahi, G. H., Tirehdast, M., Abad, E. M. K., Parsa, S., & Motakefpoor, M. (2011). Failure analysis of a gas turbine compressor. Engineering Failure Analysis, 18(1), 474-484. (Year: 2011).*

Hughes, T.J.R. et al. "Isogeometric Analysis: CAD, Finite Elements, Nurbs, Exact Geometry and Mesh Refinement". Comput. Methods Appl. Mech. Engrg. 194, 2005, pp. 4135-4195.

(Continued)

*Primary Examiner* — Bijan Mapar
(74) *Attorney, Agent, or Firm* — Oliff PLC

(57) ABSTRACT

A method of modelling at least a part of a gas turbine engine, the method comprising: generating a mesh for a feature using at least one data entity of a data structure, the at least one data entity defining a geometrical shape of the feature, wherein the data structure comprises: a set of data entities defining geometrical shapes of features; and modelling attributes associated with the geometrical shapes of the features; and assigning one or more modelling attributes using the modelling attributes associated with the geometrical shapes of the features.

19 Claims, 10 Drawing Sheets

(56) References Cited

OTHER PUBLICATIONS

Shah, JJ et al. "Expert Form Feature Modelling Shell". Department of Mechanical and Aerospace Engineering, Arizona State University, Computer-Aided Design, vol. 20, No. 9, Nov. 1988, pp. 515-524.
Sacks, Rafael et al. "Parametric 3D Modeling in Building Construction With Examples From Precast Concrete". Automation in Construction 13, 2004, pp. 291-312.
Shah, JJ. "Assessment of Features Technology". Department of Mechanical and Aerospace Engineering, Arizona State University, Computer-Aided Design, vol. 23, No. 5, Jun. 1991, pp. 331-343.
Chen, Xiang et al. "A Flexible Assembly Retrieval Approach for Model Reuse". Computer-Aided Design 44, 2012, pp. 554-574.
Chaudhari, Vinod et al. "Integrated Preliminary Design Approach for Turbomachinery Design". Proceedings of ASME Turbo Expo 2011, GT2011, Jun. 6-10, 2011, Vancouver, British Columbia, Canada, pp. 1-6.
Chang, Kuang-Hua. "A Review on Shape Engineering and Design Parameterization in Reverse Engineering". Reverse Engineering-Recent Advances and Applications, pp. 161-186.
Bouma, William et al. "A Geometric Constraint Solver". Department of Computer Science, Purdue University, Courant Institute, Jan. 1994, pp. 162-185.
Yan-Hong, Yang et al. "Design of Hydraulic Transmission Bicycle Based on Top-Down Method". Advanced Materials Research, vols. 468-471, pp. 867-870, ISSN: 1662-8985, Feb. 27, 2012.
Dye, Christopher et al. "CAD-Based Parametric Cross-Section Designer for Gas Turbine Engine MDO Applications". Computer-Aided Design and Applications, vol. 4, No. 1-4, pp. 509-518.
Shah, Jami J. et al. "Assembly Modeling As an Extension of Feature-Based Design". Research in Engineering Design, 1993, vol. 5, pp. 218-237.
Buchanan, S. Alasdair et al. "Constraint Definition System: A Computer-Algebra Based Approach to Solving Geometric-Constraint Problems". Computer-Aided Design, vol. 25, No. 12, Dec. 1993, pp. 741-750.
Balakrishnan, Govind P. "Constraint-Based Approach to Product Modelling," Thesis, Arizona State University, Dec. 1993, pp. 1-177.
Bronsvoort, Willem F. et al. "Developments in Feature Modelling". Computer-Aided Design and Applications, vol. 3, No. 5, 2006, pp. 655-664.
Ali, Ahsan. "Declarative Approach to Form Feature Definition," Thesis, Arizona State University, Aug. 1994, pp. 1-117.
Capoyleas, Vasilis et al. "Generic Naming in Generative, Constraint-Based Design". Computer-Aided Design, vol. 28, No. 1, pp. 17-26, 1996.
Di Mare, Luca et al. "Virtual Gas Turbines: Geometry and Conceptual Description". Proceedings of ASME TurboExpo 2011, GT2011, Jun. 6-10, 2011, Vancouver, Canada, pp. 1-12.
Milli, Andrea et al. "PADRAM: Parametric Design and Rapid Meshing System for Complex Turbomachinery Configurations". Proceedings of ASME Turbo Expo 2012, Jun. 11-15, 2012, Copenhagen, Denmark, pp. 1-14.
Kim, Junhwan et al. "Standardized Data Exchange of CAD Models With Design Intent". Computer-Aided Design 40, 2008, pp. 760-777.
Shah, JJ et al. "Constraint Tools". Implementation Tools, pp. 408-418.
Apr. 26, 2016 Search Report issued in European Patent Application No. 16159445.2.
Wang, Feng. "Whole Aero-Engine Meshing and CFD Simulation". Thesis, Jul. 20, 2013, pp. 156-182, XP055266382, URL: spiral.imperial.ac.uk/handle/10044/1/27235 [retrieved on Apr. 18, 2016].
Shephard, Mark S. et al. "Toward Simulation-Based Design". Finite Elements in Analysis and Design, Elsevier, Amsterdam, NL, vol. 40, No. 12, Jul. 31, 2004, pp. 1575-1598, XP002399934.
Wang, Feng et al. "Automated Hex Meshing for Turbomachinery Secondary Air System". Proceedings of the 21st International Meshing Roundtable, Apr. 18, 2012, pp. 549-566, XP55266455, URL: http://rd.springer.com/chapter/10.1007/978-3-642-33573-0_32 [retrieved on Apr. 18, 2016].
Wang, Feng. "Whole Aero-Engine Meshing and CFD Simulation". Thesis, Jul. 20, 2013, pp. 156-182, XP055266382, URL: spiral.imperial.ac.uk/handle/10044/1/27235 [retrieved on Apr. 18, 2016] [published on Oct. 31, 2015].

\* cited by examiner

METHOD OF MODELLING AT LEAST A PART OF A GAS TURBINE ENGINE

TECHNOLOGICAL FIELD

The present disclosure concerns a method, apparatus, computer program and non-transitory computer readable storage medium for modelling at least a part of a gas turbine engine.

BACKGROUND

Gas turbine engines may be used to power various systems. For example, gas turbine engines may be used to power aircraft, ships and electrical generators. FIG. 1 illustrates a gas turbine engine 10 for an aircraft according to an example. The gas turbine engine 10 has a principal and rotational axis 11 and comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19, and an exhaust nozzle 20. A nacelle 21 generally surrounds the engine 10 and defines both the intake 12 and the exhaust nozzle 20.

In operation, air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by a suitable interconnecting shaft.

Modelling a gas turbine engine may be a time consuming process and require significant human resources. In order to perform certain analysis tasks which are necessary to predict the performance and integrity of a gas turbine, it may be necessary to tessellate the surfaces of its components, or some approximate representation thereof. Similarly, it may be necessary to tessellate the volumes of solid parts and/or of gas cavities delimited by them. This operation is referred to in literature as 'meshing' and the tessellations are known as 'meshes'. Meshes may comprise any arrangement of polyhedra, polygons, edges and vertices which describe a gas turbine or its components in a way suitable for analysis. The operation of meshing may be applied to assemblies composed of more than one component, or to a part of a component In order to perform certain analysis tasks as above, it may also be necessary to associate certain properties to the boundaries of the meshes. In order to do so, a user may manually enter such properties for each mesh boundary. Such data entry may be time consuming for the user. Furthermore, there is a danger that errors may be introduced by the user during data entry that may result in surfaces having incorrect properties.

BRIEF SUMMARY

According to various embodiments there is provided a method of modelling at least a part of a gas turbine engine, the method comprising: generating a mesh for a feature using at least one data entity of a data structure, the at least one data entity defining a geometrical shape of the feature, wherein the data structure comprises: a set of data entities defining geometrical shapes of features; and modelling attributes associated with the geometrical shapes of the features; and assigning one or more modelling attributes using the modelling attributes associated with the geometrical shapes of the features.

According to various embodiments there is provided a method of modelling machinery, the method comprising: generating a mesh for a feature using at least one data entity of a data structure, the at least one data entity defining a geometrical shape of the feature, wherein the data structure comprises: a set of data entities defining geometrical shapes of features; and modelling attributes associated with the geometrical shapes of the features; and assigning one or more modelling attributes using the modelling attributes associated with the geometrical shapes of the features.

The feature may be a physical feature of a gas turbine engine. The feature may be an aperture of a gas turbine engine.

The modelling attributes may include one or more of: physical attributes; movement attributes; and mesh attributes.

The one or more modelling attributes may be assigned to the generated mesh.

The one or more modelling attributes may be assigned prior to the generation of the mesh.

The one or more modelling attributes may be assigned automatically without user intervention.

The method may further comprise: editing a data entity of the set of data entities to change the geometrical shape of a feature; generating a further mesh for the feature using the edited data entity; changing one or more modelling attributes associated with the changed geometrical shape; and assigning the changed one or more modelling attributes to the further mesh.

The method may further comprise assembling a model of at least a part of the gas turbine engine, the model including the generated mesh and the assigned one or more modelling attributes.

According to various embodiments there is provided a computer program that, when read by a computer, causes performance of the method as described in any of the preceding paragraphs.

According to various embodiments there is provided a non-transitory computer readable storage medium comprising computer readable instructions that, when read by a computer, causes performance of the method as described in any of the preceding paragraphs.

According to various embodiments there is provided apparatus to model at least a part of a gas turbine engine, the apparatus comprising: a controller to: generate a mesh for a feature using at least one data entity of a data structure, the at least one data entity defining a geometrical shape of the feature, wherein the data structure comprises: a set of data entities defining geometrical shapes of features; and modelling attributes associated with the geometrical shapes of the features; and assign one or more modelling attributes using the modelling attributes associated with the geometrical shapes of the features.

The feature may be a physical feature of a gas turbine engine. The feature may be an aperture of a gas turbine engine.

The modelling attributes may include one or more of: physical attributes; movement attributes; and mesh attributes.

The one or more modelling attributes may be assigned to the generated mesh.

The one or more modelling attributes may be assigned prior to the generation of the mesh.

The one or more modelling attributes may be assigned automatically without user intervention.

The controller may be to: edit a data entity of the set of data entities to change the geometrical shape of a feature; generate a further mesh for the feature using the edited data entity; change one or more modelling attributes associated with the changed geometrical shape; and assign the changed one or more modelling attributes to the further mesh.

The controller may be to assemble a model of at least a part of the gas turbine engine. The model may include the generated mesh and the assigned one or more modelling attributes.

The skilled person will appreciate that except where mutually exclusive, a feature described in relation to any of the above aspects may be applied mutatis mutandis to any other aspect.

BRIEF DESCRIPTION

Examples will now be described by way of example only, with reference to the Figures, in which.

DETAILED DESCRIPTION

Figure 1:
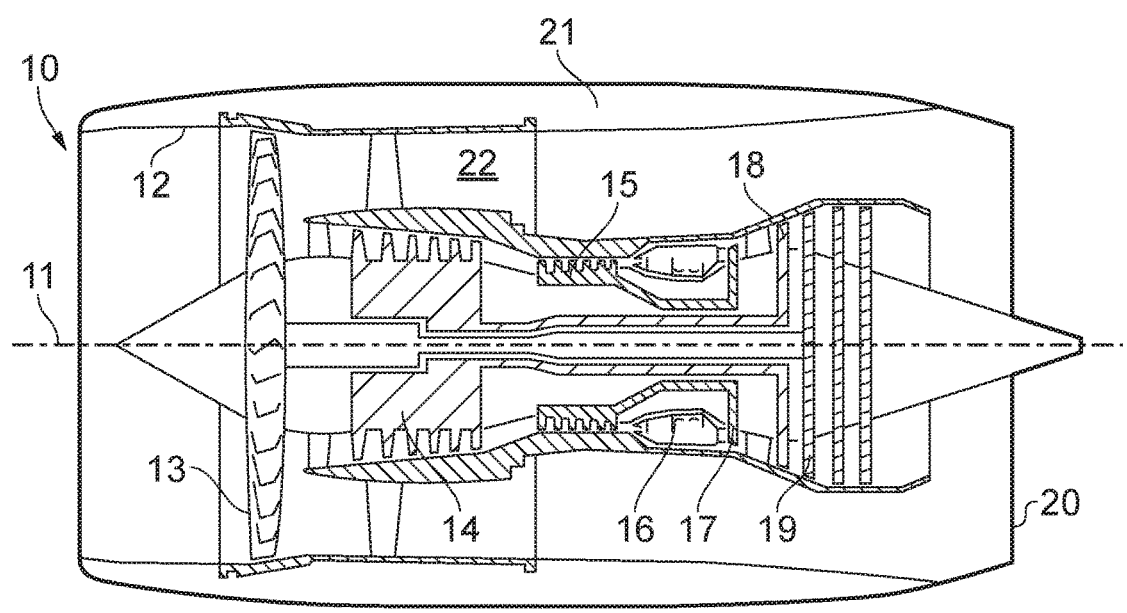
FIG. 1 illustrates a cross sectional side view of a gas turbine engine.
Figure 2:
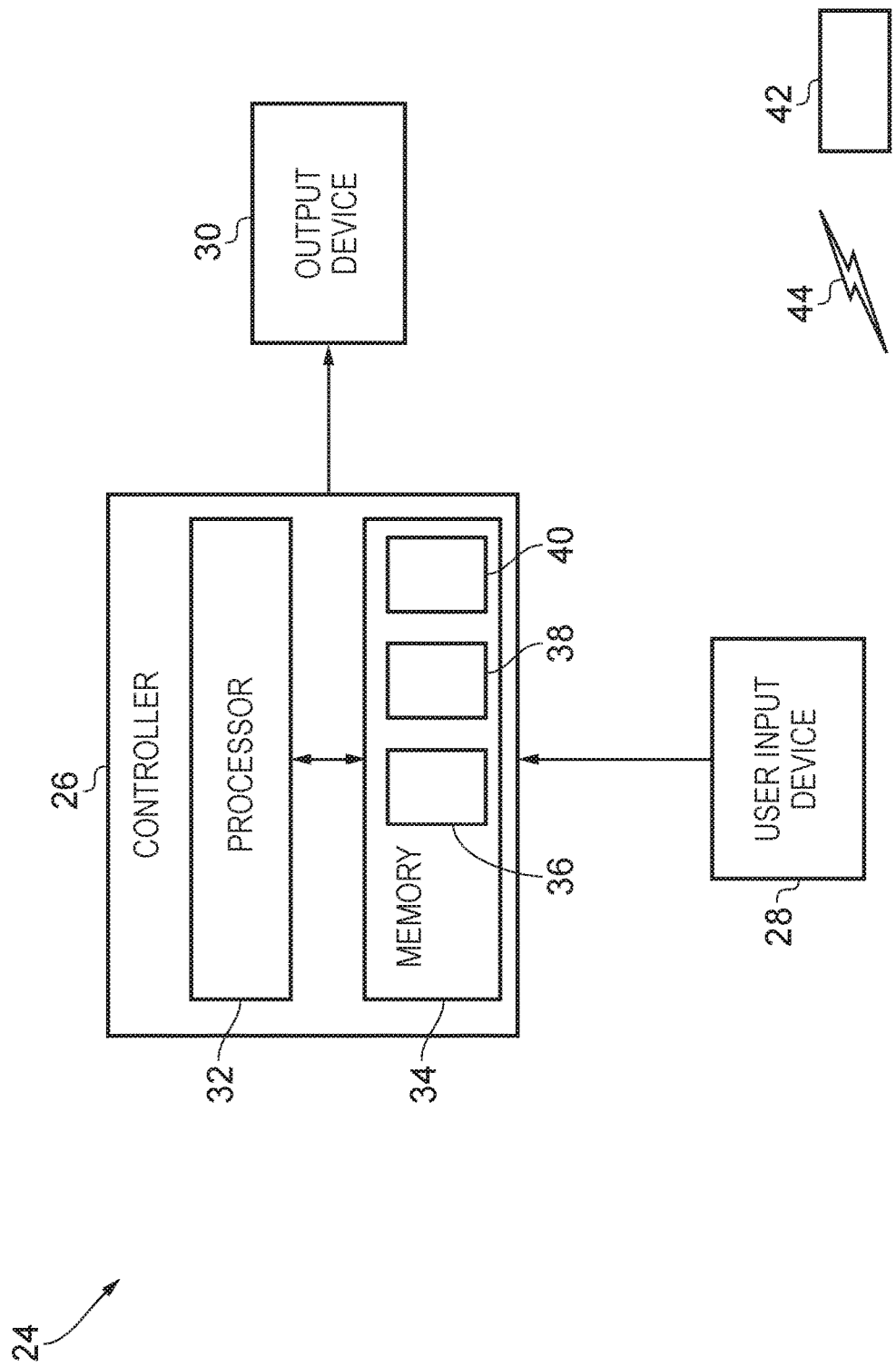
FIG. 2 illustrates a schematic diagram of apparatus for modelling at least a part of a gas turbine engine according to various examples.

FIG. 2 illustrates an apparatus 24 for modelling at least a part of a gas turbine engine 10. The apparatus 24 includes a controller 26, a user input device 28, and an output device 30. The apparatus 24 may be any computing device and may be located in a single location (for example, the apparatus 24 may be a personal computer (PC) located in a single room) or may be distributed across a plurality of locations (for example, the controller 26 may be located remotely (in another room, building, city, or country) from the user input device 28 and the output device 30).

Figure 10:
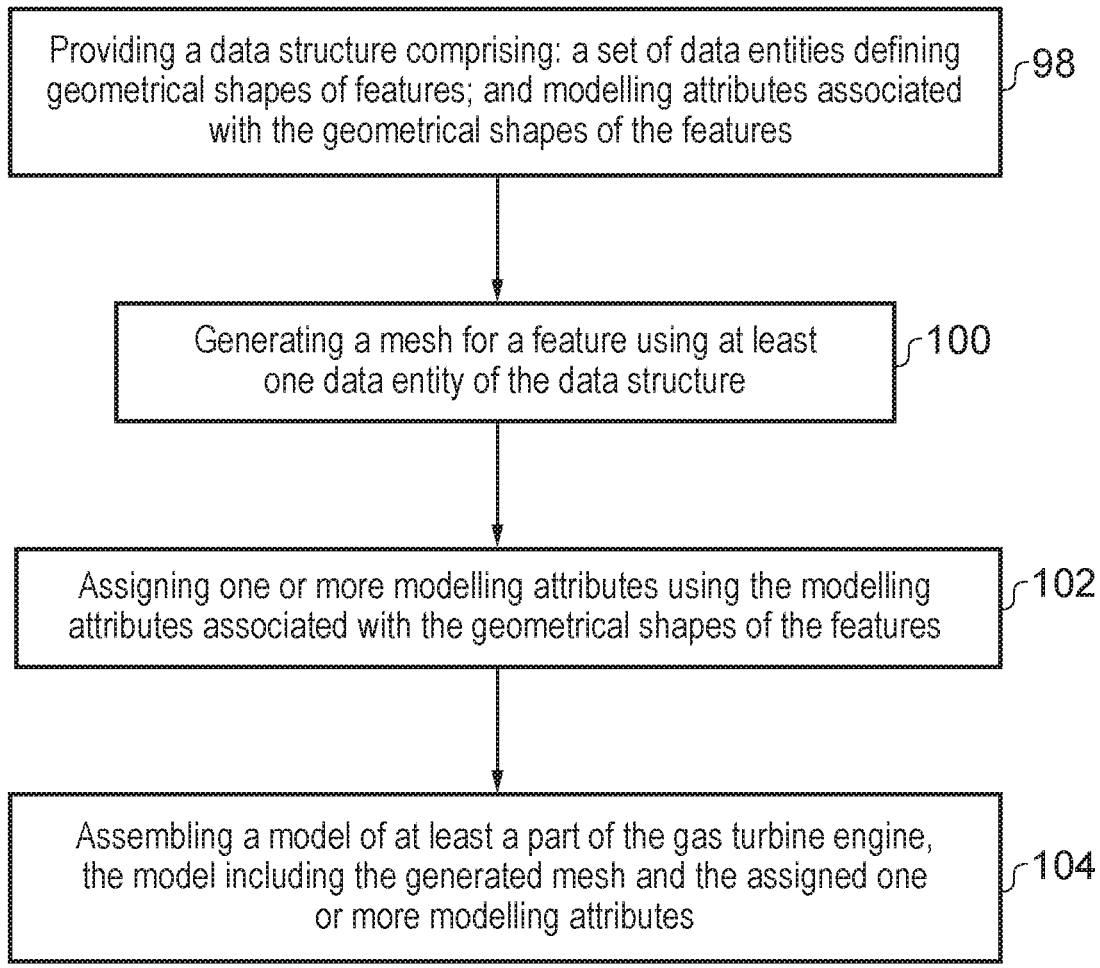
FIG. 10 illustrates a flow diagram of a method according to various examples.
Figure 11:
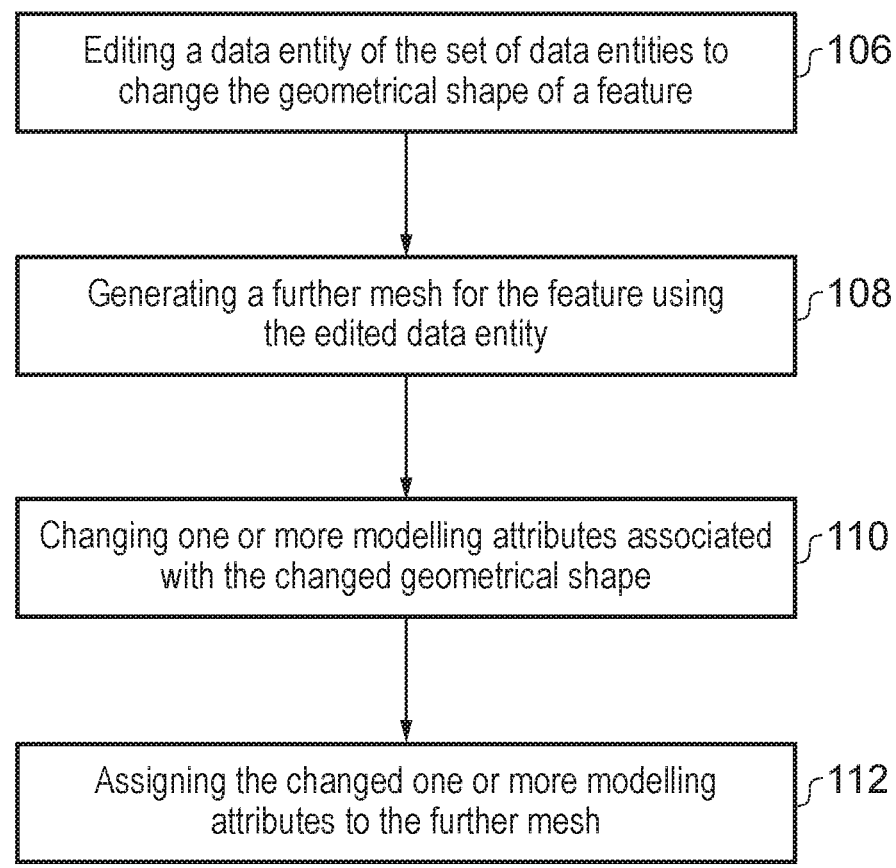
FIG. 11 illustrates a flow diagram of another method according to various examples.
Figure 12A:
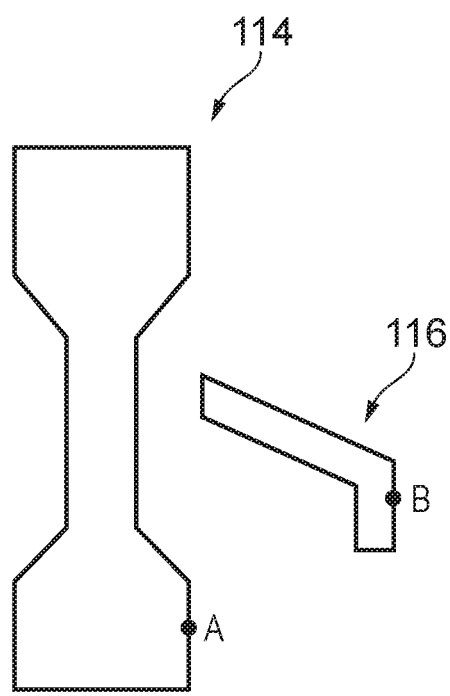
FIG. 12A illustrates a first schematic diagram of a disc of a gas turbine engine within the model according to various example.
Figure 12B:
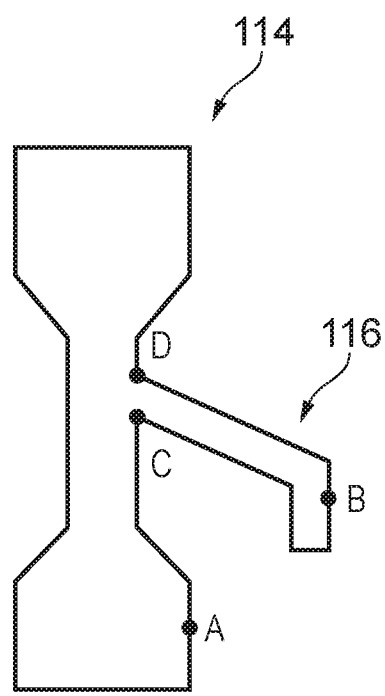
FIG. 12B illustrates a second schematic diagram of the disc within the model according to various examples.

The controller 26 may comprise any suitable circuitry to cause performance of the methods described herein and as illustrated in FIGS. 10 and 11. For example, the controller 26 may comprise at least one application specific integrated circuit (ASIC) and/or at least one field programmable gate array (FPGA) to perform the methods. By way of another example, the controller 26 may comprise at least one processor 32 and at least one memory 34. The memory 34 stores a computer program 36 comprising computer readable instructions that, when read by the processor 32, causes performance of the methods described herein, and as illustrated in FIGS. 10 and 11. The computer program 36 may be software or firmware, or may be a combination of software and firmware.

The memory 34 stores a data structure 38 that is described in greater detail in the following paragraphs. Generally, the data structure 38 includes a plurality of data entities from which a model of a gas turbine engine may be constructed. Additionally, the memory 34 may store at least one model 40 of a gas turbine engine generated by the apparatus 24 as described in the following paragraphs. In some examples, the memory 34 may not permanently store the model 40 of the gas turbine engine and instead, the model 40 may be built on demand and then stored (at least temporarily) by the memory 34.

The processor 32 may be located at a single location (for example, within a housing or cover of a computer), or may be distributed across a plurality of locations (for example, the processor 32 may be distributed within a plurality of separate housings or covers of different computers, which may be located in the same room, or in different rooms, buildings, cities or countries). The processor 32 may include at least one microprocessor and may comprise a single core processor, or may comprise multiple processor cores (such as a dual core processor, a quad core processor, and so on).

The memory 34 may be located at a single location (for example, within a housing or cover of a computer), or may be distributed across a plurality of locations (for example, the memory 34 may be distributed within a plurality of separate housings or covers of different computers, which may be located in the same room, or in different rooms, buildings, cities or countries). The memory 34 may be any suitable non-transitory computer readable storage medium, data storage device or devices, and may comprise a hard disk and/or solid state memory (such as flash memory). The memory 34 may be permanent non-removable memory, or may be removable memory (such as a universal serial bus (USB) flash drive).

The computer program 36, and/or the data structure 38, and/or the model 40, may be stored on a non-transitory computer readable storage medium 42. The computer program 36, and/or the data structure 38, and/or the model 40, may be transferred from the non-transitory computer readable storage medium 42 to the memory 34. The non-transitory computer readable storage medium 42 may be, for example, a USB flash drive, a compact disc (CD), a digital versatile disc (DVD) or a Blu-ray disc. In some examples, the computer program 42 may be transferred to the memory 34 via a wireless or wired signal 44.

The user input device 28 may include any suitable device or devices for enabling a user to control the apparatus 24. For example, the user input device 28 may include a keyboard, a keypad, a mouse, a touch pad, or a touch screen display. The controller 26 is arranged to receive control signals from the user input device 28.

Figure 3:
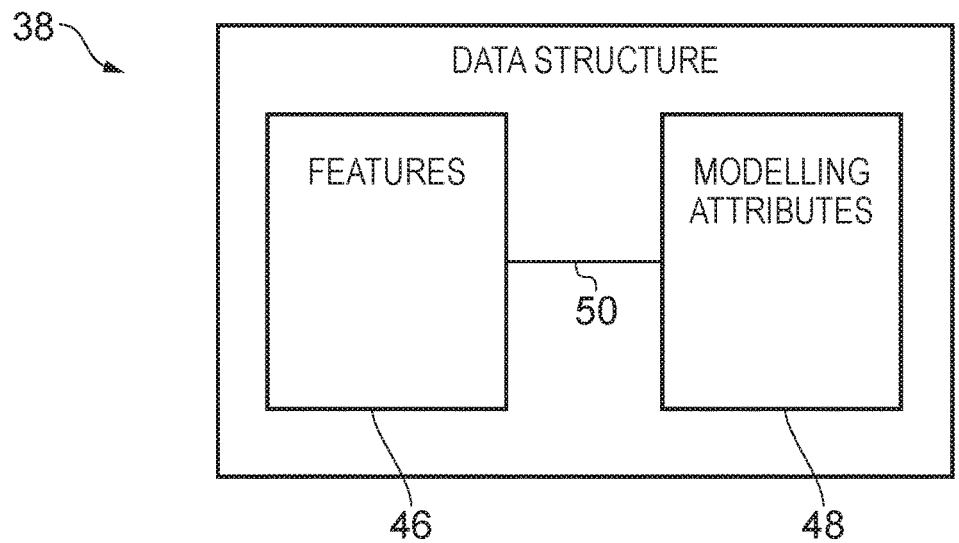
FIG. 3 illustrates a schematic diagram of a data structure according to various examples.

The output device 30 may include any suitable device or devices for conveying information to a user. For example, the output device 30 may be a display (such as a liquid crystal display, or a light emitting diode display, or an active matrix organic light emitting diode display, or a thin film transistor display, or a cathode ray tube display) and/or a printing device (such as an inkjet printer or a laser printer for example). The controller 26 is arranged to provide a signal to the output device 30 to cause the output device 30 to convey information to the user. FIG. 3 illustrates a schematic diagram of the data structure 38 including: a set of data entities 46 for features; and a plurality of modelling attributes 48. It should be appreciated that the data structure 38 may be coded in any suitable programming language. For example, the data structure 38 may be implemented as a library of object-oriented, hierarchical C++ classes.

The set of data entities 46 represents geometrical shapes of features of a gas turbine engine (where features include 'physical features' and apertures in the gas turbine engine). As used herein, a 'physical feature' is an assembly of components, a component, or a part of a component, of a gas turbine engine. In other words, a 'physical feature' may not correspond to a single, recognisable component of the gas turbine engine, and each component of a gas turbine engine may be reproduced by assembling one or more physical features.

Data entities in the set of data entities 46 may be referred to as 'design-objects', which control the geometric representation of the features. The data structure 38 comprises a library of multiple data entities, at least some of which may be dedicated to a gas turbine engine application. The data entities 46 may have their own taxonomy and follow an internal hierarchy for acquiring, retaining, hiding and passing on various data.

The set of data entities 46 may specify the allowable position or positions of features within the model of the gas turbine engine. For example, the set of data entities 46 may specify one or more axial positions for a bearing within a model of the gas turbine engine. Consequently, the set of data entities 46 may specify starting positions of components or assemblies of components within the model of the gas turbine engine.

Figure 4:
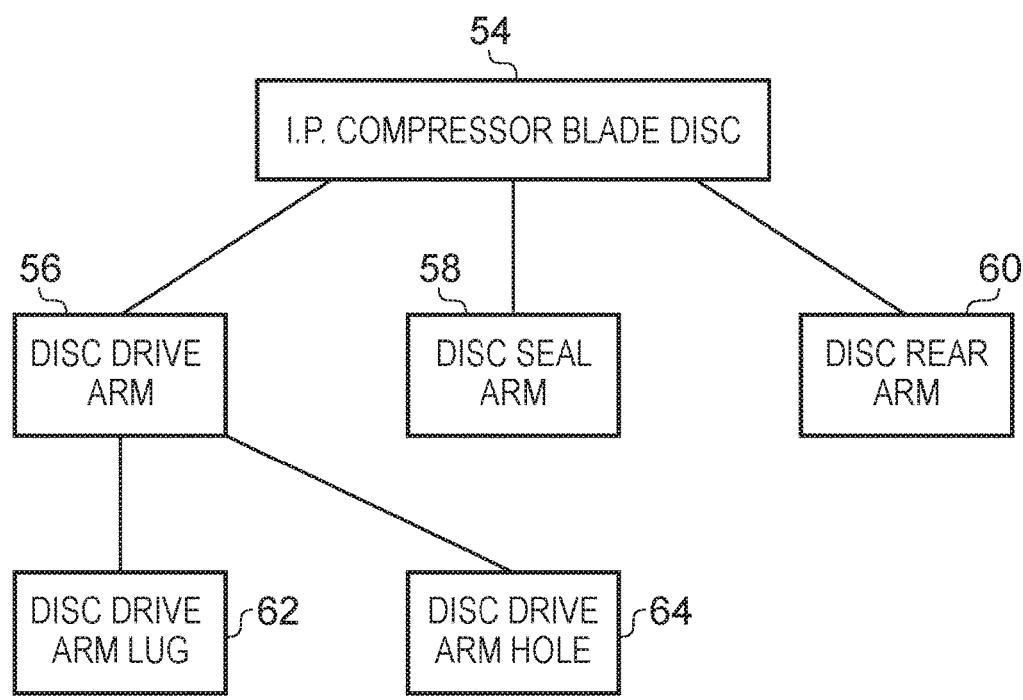
FIG. 4 illustrates a schematic diagram of data entities organised in a tree structure for an intermediate pressure compressor blade disc according to an example.
Figure 5:
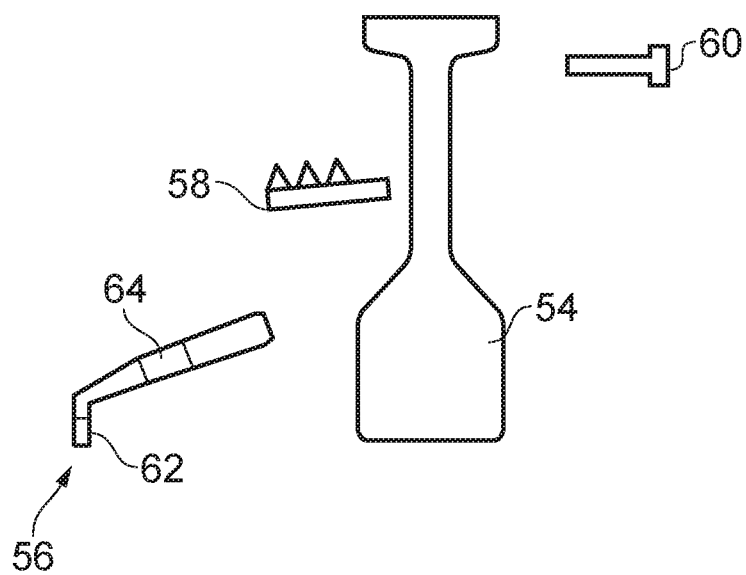
FIG. 5 illustrates a graphical representation of the data entities illustrated in FIG. 4 according to an example.

A single assembly of features may form a component of a gas turbine engine (as illustrated in FIGS. 4 and 5 for an intermediate pressure compressor blade disc). Additionally, a plurality of assemblies of features may form a component of a gas turbine engine. For example, a seal may be formed by a rotatable assembly of features, and by a stationary assembly of features.

As described in greater detail in the following paragraphs with reference to FIGS. 4, 5 and 6, the set of data entities 46 may be arranged in a tree structure having parent and child relationships. In such a tree structure, data entities for features located near the root of the assembly tree carry general information and represent high level assemblies, such as spools or modules (or even the whole engine). Such features at the root of the tree may also be referred to as 'top level' features. Data entities for features located near the bottom of the assembly tree represent finer and finer geometric details. Consequently, a child feature is an addition to the parent feature and the position of the child feature may be determined by its position relative to the parent feature, and by the position of the parent feature. Such features near the bottom of the assembly tree may be referred to as 'bottom level' features. The assembly tree may be executed by a method that follows a partial sequential or procedural approach.

In other examples, the set of data entities 46 may not be arranged in a tree structure and instead, at least some of the set of data entities 46 may be linked to one another. Such assembled data entities may be executed by means of constraint-based declarative statements. For example, a data entity in the set of data entities 46 for a feature may include information that allows the feature to be positioned (or have its position, orientation, scale or any other geometric property modified according to certain criteria) relative to another feature.

It should be appreciated that in the above described examples, the data in the set of data entities 46 may enable the mechanical design intent of a component or an assembly of components to be generated and preserved. In more detail, where data entities are linked to other data entities or are arranged in a tree structure, the relative positioning of the features within the component may be preserved during assembly of the model.

In further examples, the set of data entities 46 may not be linked to one another or have a tree structure.

The modelling attributes 48 are associated with the geometrical shapes of the features in the set of data entities 46 (as indicated by the links 50) and are described in greater detail in the following paragraphs with reference to FIG. 7. In summary, the modelling attributes 48 define the properties of the surfaces of the features in the model.

FIG. 4 illustrates a schematic diagram of data entities, illustratively organised in a tree structure, for an intermediate pressure compressor blade disc according to an example. In more detail, the diagram illustrates an intermediate pressure (IP) compressor blade disc data entity 54, a disc drive arm data entity 56, a disc seal arm data entity 58, a disc rear arm data entity 60, a disc drive arm lug data entity 62, and a disc drive arm hole data entity 64. It should be appreciated that the data entities 54, 56, 58, 60, 62, 64 are a subset of the data structure 38 for the gas turbine engine.

The tree structure is arranged so that the IP compressor blade disc data entity 54 is the root of the tree structure and is the parent physical feature to the disc drive arm data entity 56, the disc seal arm data entity 58, and the disc rear arm data entity 60. The disc drive arm data entity 56 is the parent physical feature to the disc drive arm lug data entity 62 and to the disc drive arm hole data entity 64.

FIG. 5 illustrates a graphical representation of the intermediate pressure (IP) compressor blade disc data entity 54, the disc drive arm data entity 56, the disc seal arm data entity 58, the disc rear arm data entity 60, the disc drive arm lug data entity 62, and the disc drive arm hole data entity 64.

Figure 6:
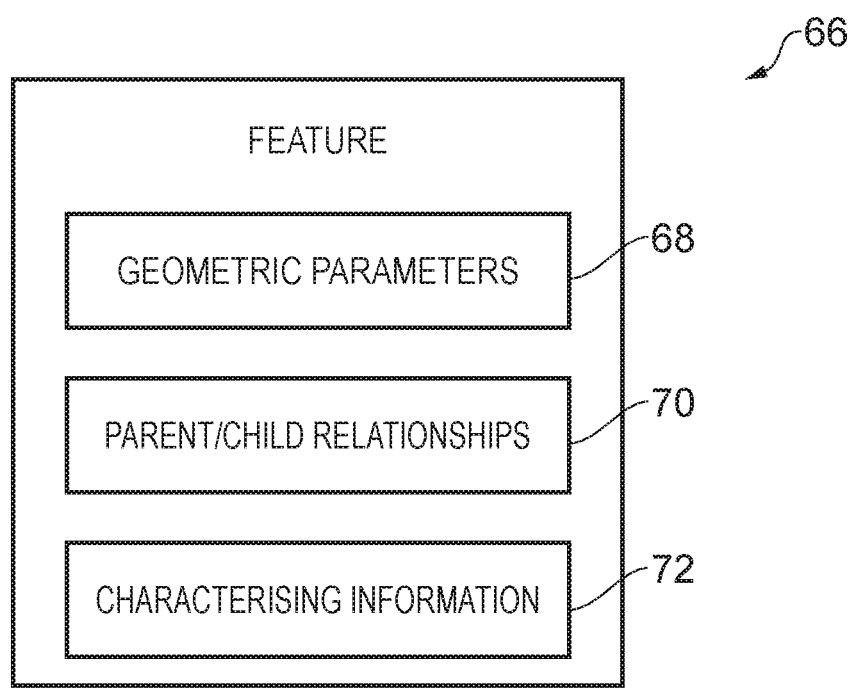
FIG. 6 illustrates a schematic diagram of a data entity for a physical feature according to various examples.

FIG. 6 illustrates a schematic diagram of a data entity 66 for a feature according to various examples. The data entity 66 includes geometric parameters 68, parent/child relationship data 70, and characterizing information 72.

The geometric parameters 68 define the shape of the feature. For example, where the feature is a disc, the geometric parameters 68 may define the cross section of the disc by describing its thickness distribution. The geometric parameters 68 enable the controller 26 to present the feature via the output device 30 and graphically represent the feature. Where the feature is an aperture (which may be a 'through aperture' or a 'blind aperture') in a parent feature, the geometric parameters 68 may define the aperture as the removal of material from the parent feature.

When a data entity 66 is instantiated and geometric parameters are defined, the controller 26 may with advantage perform some validation operations. As an example, the program 38 may verify that no mechanical interference is generated between parts in relative motion.

The parent/child relationship data 70 identifies the parent physical feature and/or the child physical feature(s) for that particular physical feature. The parent/child relationship data 70 may also define the intended positioning between the feature and the parent feature and/or the child feature.

The characterising information 72 includes data that provides information about the feature and/or the data entity 66 for the feature which are not bound to a particular operating point or a particular state of the machine containing that feature. For example, the characterising information 72 may include a bill of materials for the feature, manufacturing instructions, modification history for the data entity 66, and/or the designer's notes.

Figure 7:
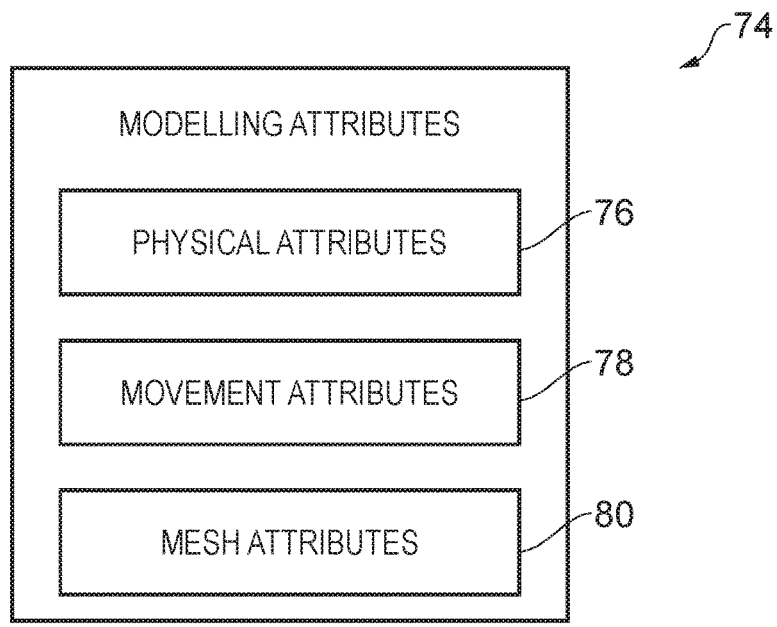
FIG. 7 illustrates a schematic diagram of modelling attributes according to various examples.

FIG. 7 illustrates a schematic diagram of modelling attributes 74 according to various examples.

In the present disclosure, modelling attributes attached to a feature are pieces of information that may be used to perform analysis tasks on that feature and are not included in the characterising information 72. The information included in the modelling attributes may include physical data as well as information that is specific to the analysis to be performed. As an example, modelling attributes intended to support a stress analysis task may include information about loads applied to the feature surface, information about the state of motion of the feature, as well as information stating the reference of the analyst with regard to the type of finite elements to be used.

According to a similar example, modelling attributes intended to support a Computational Fluid Dynamics analysis task may include surface solid temperatures and flow conditions at certain boundaries, the rotational speed of the walls and data representing the preference of the analyst with regard to the style and resolution of the mesh. In general, the modelling attributes 74 may include physical attributes 76, and/or movement attributes 78, and/or mesh attributes 80 which are associated with the data entities 46. Additional modelling attributes may include the static deflection of surfaces at a desired operating condition with respect to the reference geometry according to variations in temperature and load in the machine.

In the first part of the present disclosure, it has been mentioned that the features may be arranged in a tree. If this is the case, it is intended that all the information provided by the characterizing attributes 72 and modelling attributes 74 attached to a feature apply to all its children, unless not applicable or locally overridden by corresponding characterizing attributes and modelling attributes.

Each feature may be associated to one characterising data set and to any number of modelling data sets. Multiple modelling data sets may be needed to reflect the variety of types of analysis task needed for a single component, as well as the variety of conditions to be analysed for each type of tasks.

The association between modelling data and features may be achieved, according to an example, by including in the modelling data sufficient information to identify the feature the data are associated to. This may be achieved, according to an example, by attributing to a feature a unique identifying number, and including this number in the modelling data sets that are to be associated to that feature.

Each feature may generate a number of different surfaces, and each surface may be associated to independent data sets. Therefore, it may be necessary to include sufficient information in the modelling data to identify which surface on the feature the data refer to. Furthermore the feature implementation may guarantee that the surfaces each feature generates are uniquely identifiable and that they are consistently identifiable. This may be achieved, according to an example, by identifying different portions of the model 40, with identifying strings or tags. The same identifying tags may be used to denote corresponding portions of the surface of similar feature types. However, a pair formed by a unique feature identifier and a surface tag can uniquely identify a portion of the boundary of the model 40.

The physical attributes 76 define a physical aspect of the surface. For example, the physical attributes 76 may define whether a surface of a feature provides a solid boundary (that is, a boundary defined by material of a component, or a part of a component), or whether the surface of a feature provides a fluid boundary (that is, a boundary to the flow of fluid that is not defined by material of a component, or a part of a component). Advantageously, this information may be used, as an example, when choosing the type of mesh to be generated for a particular analysis task. Additionally or alternatively, the physical attributes 76 may define the material of the surface of the feature. Additionally or alternatively, the physical attributes 76 may define the effective roughness of a surface of a feature. Additionally or alternatively, the physical attributes 76 may define information that is not defined in the geometric parameters 68. Examples of such properties may be the parameters of models to describe the behaviour of an acoustic lining applied to the surface.

The movement attributes 78 may define whether the surface of a feature is moveable relative to a frame of reference (for example, the principal axis 11 of the gas turbine engine 10) and at what velocities the surface may move. For example, the movement attributes 78 may define the rotational frame of the surface of the feature.

In order to facilitate the task of an analyst, all attributes assigned to a feature may apply equally well to portion of the boundary of the model 40 associated to the children of that feature, or features logically subordinate to that, in the sense described above with regard to child/parent relationships. In the case of frame attributes, this may be advantageous because frame information may need to be specified for only a very small number of large assemblies and need not be repeated for the numerous features normally required to describe a gas turbine.

Figure 8A:
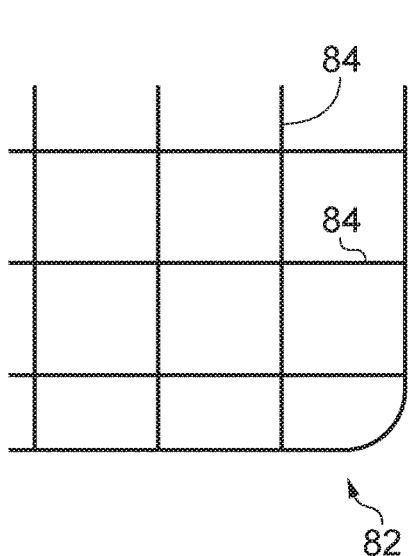
FIG. 8A illustrates a diagram of a first mesh according to various examples.
Figure 8B:
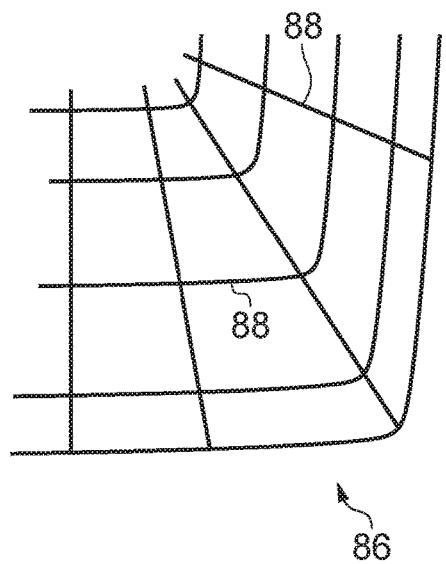
FIG. 8B illustrates a diagram of a second mesh according to various examples.
Figure 9A:
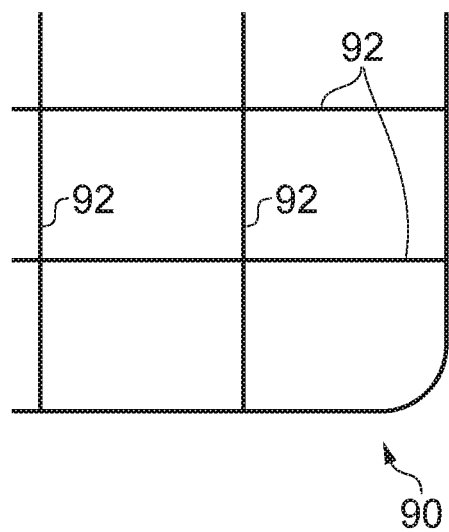
FIG. 9A illustrates a diagram of a third mesh according to various examples.
Figure 9B:
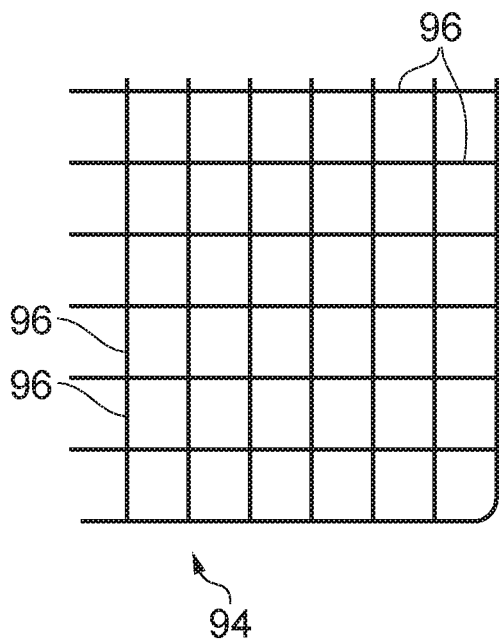
FIG. 9B illustrates a diagram of a fourth mesh according to various examples.
Figure 9C:
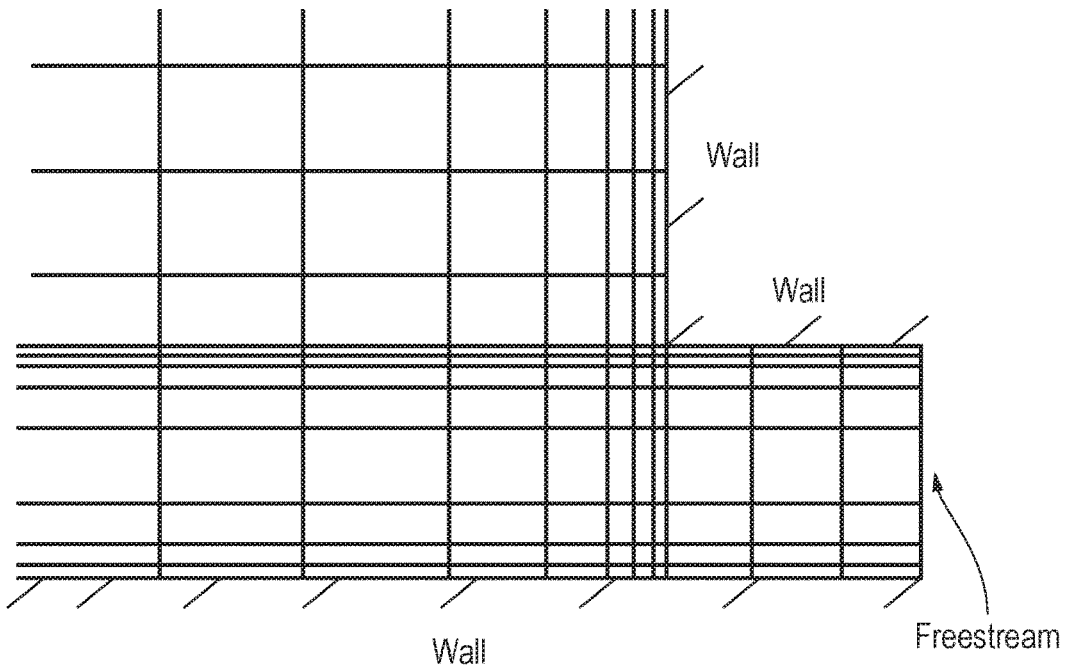
FIG. 9C illustrates a diagram of a fifth mesh according to various examples.
Figure 9D:
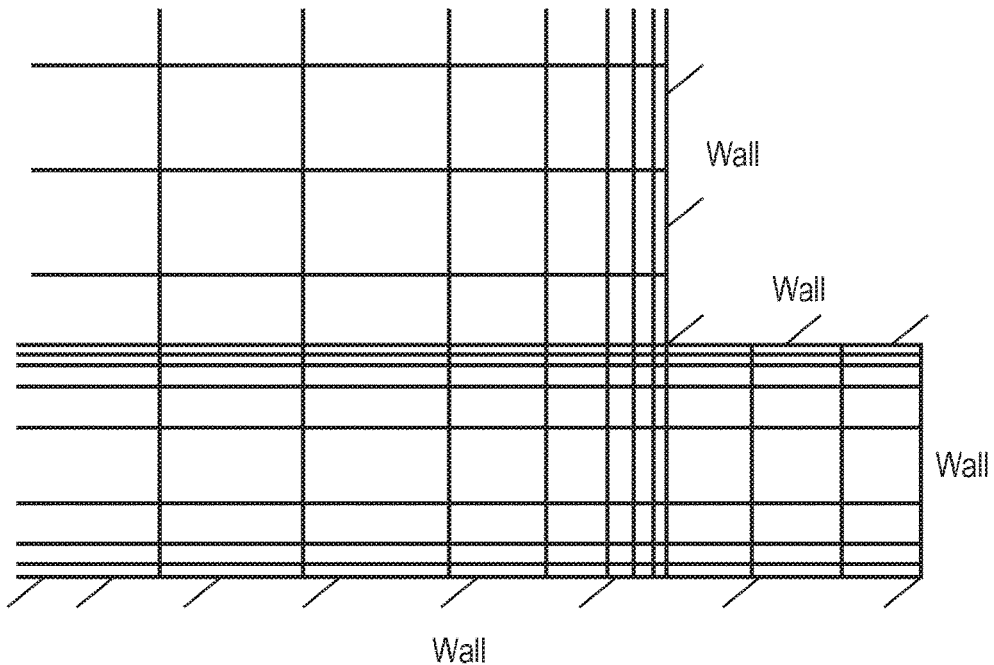
FIG. 9D illustrates a diagram of a sixth mesh according to various examples.

The mesh attributes 80 may define the structure of the mesh applied to the feature. Advantageously, the mesh attributes 80 may be used to determine whether or not the mesh is to be clustered towards a certain portion of the boundary. By way of an example, FIG. 8A illustrates a mesh 82 where the grid lines 84 of the mesh 82 includes a plurality of parallel rows of lines and a plurality of parallel columns of lines and consequently, the mesh 82 defines a plurality of square or rectangular faces. By way of another example, FIG. 8B illustrates a mesh 86 where the grid lines 84 of the mesh 86 have a spider web structure and define square and trapezium shaped faces. Additionally or alternatively, the mesh attributes 80 may define the resolution of grid lines of the mesh. By way of an example, FIG. 9A illustrates a mesh 90 where the grid lines 92 are spaced apart from one another and consequently, the mesh 90 has a relatively low resolution. By way of a further example, FIG. 9B illustrates a mesh 94 where the grid lines 96 are relatively closely packed and consequently, the mesh 94 has a relatively high resolution. The choice between these arrangements may be based on whether the portion of the boundary being treated is a solid wall or an aerodynamic boundary as illustrated in FIG. 9C (where an aerodynamic boundary has a relatively low resolution) and FIG. 9D (where a solid wall has a relatively high resolution).

The operation of the apparatus 24 is described in the following paragraphs with reference to the flow diagrams illustrated in FIGS. 10 and 11.

At block 98, the method includes providing the data structure 38 comprising: the set of data entities 46 defining geometric shapes of features; and the modelling attributes 48 associated with the geometrical shapes of the features. For example, the data structure 38 (or a part of the data structure 38) may be provided by a user of the apparatus 24 who uses the apparatus 24 (or another computing device) to enter data for new data entities to generate the data structure 38. By way of another example, the data structure 38 (or a part of the data structure 38) may be provided by the controller 26 loading or accessing the data structure 38 from the memory 34.

Block 98 may also include providing a feature to a model using the data structure 38. For example, a user may operate the user input device 28 to include a feature (such as a shaft, a bearing, a vane, and so on) within a model of a gas turbine engine. By way of another example, the controller 26 may provide a feature to a model of a gas turbine engine automatically without user intervention (for example, the controller 26 may automatically provide a child feature of a parent feature within the model).

At block 100, the method includes generating a mesh for a feature using at least one data entity 46 of the data structure 38. The controller 26 may read the geometric parameters 68 of the data entity for the feature and generate a mesh to at least partially envelope the feature. The mesh may be a polygonal mesh, a volumetric mesh, or may be any other suitable mesh.

For example, where the feature is a cylinder, the controller 26 may read the geometric parameters 68 of the cylinder data entity, and using the shape defined by the geometric parameters 68, generate and apply a mesh to the cylinder to define at least a part of the surface of the cylinder. In some examples, block 100 may be performed by a 'mesh generator' software module of the computer program 36.

At block 102, the method includes assigning one or more modelling attributes using the modelling attributes associated with the geometrical shapes of the features. The controller 26 may use the links 50 between the data entities 46 and the modelling attributes 48 to select one or more modelling attributes for the feature within the model. Where block 102 is performed subsequent to block 100, the controller 26 may assign the one or more modelling attributes to the generated mesh. Where block 102 is performed prior to block 100, the controller 26 may assign the one or more modelling attributes to the feature within the model (which may, or may not be later assigned to the mesh generated in block 100). In some examples, block 102 may be performed by the 'mesh generator' software module referred to in the preceding paragraph.

By way of an example, where the feature is a turbo machinery blade, the mesh generator module may extract the blade geometry from the geometric parameters 68 of a blade data entity. The blade geometry may include the hub or casing annulus lines and the leading and trailing edges of the blade. Together with the blade geometry, modelling attributes associated with the blade geometry (such as rotational frame of the blade and the aerodynamic boundary types) are also extracted from the modelling attributes 48. The mesh generator software module may then generate and apply the mesh to the blade feature and then automatically assign the extracted modelling attributes to the generated mesh. The assignment of modelling attributes may be an embedded function of the mesh generator software module.

In further examples, where the object is a cavity in the secondary air system, the mesh generator extracts the cavity geometry from the geometric parameters 68. The geometry is a parametric representation of a manifold polygon. For each side of the polygon, their modelling attributes 74 are also obtained by the mesh generator. Then based on these modelling attributes, a mesh is generated for the cavity based on the mesh attributes, and after the mesh is created the physical and movement attributes are also assigned to the surfaces of the cavity.

At block 104, the method includes assembling a model of at least a part of the gas turbine engine, where the model includes the mesh generated in block 100, and the one or more modelling attributes assigned in block 102. The controller 26 may provide the assembled model to the output device 30 for presentation to a user. For example, the controller 26 may control a display to display the assembled model. By way of another example, the controller 26 may control a printing device to print one or more images of the assembled model on a printing medium.

The apparatus 24 and the methods described above may provide several advantages. First, the apparatus 24 and the methods may enable modelling attributes to be assigned automatically and without user intervention and this may reduce the time required to model a mechanical system such as a gas turbine engine. For example, where modelling involves a large scale numerical simulation for complex geometries (for example, a simulation of the whole gas path of a three shaft gas turbine engine), the apparatus 24 and methods described above may reduce pre-processing time from days or weeks, to several hours. Second, since the assigning of the one or more attributes may be automatically performed by the controller 26, the apparatus 24 and the methods described above may reduce the human resources required for modelling a mechanical system. Consequently, the apparatus 24 and the methods may reduce the cost of modelling a mechanical system and enable modelling to be performed by a smaller number of users.

FIG. 11 illustrates a flow diagram of another method according to various examples. The method illustrated in FIG. 11 may be performed subsequent to block 100, 102 or 104 of the method illustrated in FIG. 10.

At block 106, the method includes editing a data entity in the set of data entities 46 to change the geometrical shape of a feature. For example, a user may operate the user input device 28 to edit one or more geometric parameters 68 of a data entity to change the geometry of the associated feature. Additionally or alternatively, the controller 26 may edit (without user input or control) one or more geometric parameters 68 of a data entity to change the geometry of the associated feature (for example, in response to a geometric parameter 68 of a parent feature being changed).

At block 108, the method includes generating a further mesh for the feature using the edited data entity. For example, the controller 26 may read the edited geometric parameters 68 of the data entity for the feature and generate and apply a new mesh to at least partially envelope the feature.

At block 110, the method includes changing one or more modelling attributes associated with the changed geometrical shape of the feature. Block 110 may be performed prior to block 108, or subsequent to block 108. The controller 26 may automatically update the modelling attributes associated with the edited data entity to take into account the changes made to the geometrical shape of the feature.

For example, the disc 114 has its own modelling attributes, such as physical attributes, mesh attributes and movement attributes. These attributes are assigned on the boundary patch A, where A is a break point that is used to mark surfaces of a feature. The disc arm 116 has its own modelling attributes, such as physical attributes, mesh attributes and movement attributes. These attributes are assigned on the boundary patch B.

When the disc arm 116 is attached to a disc, two break points, C and D are created based on the intersection of the disc 114 and the disc arm 116. The intersecting part of the disc 114 and the disc arm 116 is then removed. The boundary patch of the disc 114, 116 is then made up of patches: A to C, C to B, B to D, and D to A. Patches A to C and D to A retain all the modelling properties of the disc 114 (prior to joining with the disc arm 116). Patches C to B and B to D retain all the properties of the disc arm 116.

The mesh movement attributes for patches C to B and B to D of the disc arm 114 are updated to provide mechanically consistency with the disc 114. The mesh for the disc 114 is then removed, and the mesh generator updates the geometries and the modelling attributes, and then generates a new mesh, and then assigns the modelling attributes to the new mesh.

At block 112, the method includes assigning the changed one or more modelling attributes to the further mesh in the model.

The method may then move to block 104 illustrated in FIG. 10 and the model may be reassembled using the changed geometrical shape of the feature and the changed modelling attributes.

The method described above with reference to FIG. 11 may be advantageous in that since at least blocks 108, 110, 112 may be performed automatically by the controller 26, a user may not be required to reassign the modelling attributes to the further mesh. This may reduce the time and human resources required to edit the geometrical shapes of features in a model of a mechanical system.

It will be understood that the disclosure is not limited to the embodiments above-described and various modifications and improvements can be made without departing from the concepts described herein. For example, the above described methods may be used to model machinery other than gas turbine engines, and may be used to model rotating electrical machinery for example. Furthermore, the above described methods may be used to model a gas turbine engine having a different (architecture) to the one mentioned in the preceding paragraphs. For example, the above described methods may be used to model a two shaft gas turbine engine.

It should be appreciated that the above mentioned methods may be applied equally for two-dimensional features of the model as well as for three-dimensional features of the model.

Except where mutually exclusive, any of the features may be employed separately or in combination with any other features and the disclosure extends to and includes all combinations and sub-combinations of one or more features described herein.

What is claimed is:

1. A computer-implemented method of modelling at least a part of a gas turbine engine, the method comprising:
   storing a data structure in a memory;
   generating, by a computer, a mesh for a feature using at least one data entity of the data structure, the at least one data entity defining a geometrical shape of the feature, wherein the data structure comprises: a set of data entities defining geometrical shapes of features; and modelling attributes associated with the geometrical shapes of the features;
   assigning, by the computer, one or more modelling attributes using the modelling attributes associated with the geometrical shapes of the features, wherein
   the modelling attributes include movement attributes that define whether the surface of a feature is moveable relative to a frame of reference of the gas turbine engine and at what velocities the surface may move, and
   a plurality of data entities of the at least one data entity is arranged in a tree structure having parent and child relationships, such that a data entity for features located at a root of the tree structure constitutes a parent, and a data entity for features branching from the root constitutes a child of the parent, the parent and child having related features; and
   applying all modelling attributes equally to the parent and child having the related features unless the modelling attributes are not applicable to the child having the related features or are overridden by corresponding modelling attributes.

2. The computer-implemented method as claimed in claim 1, wherein the feature is a physical feature of a gas turbine engine.

3. The computer-implemented method as claimed in claim 1, wherein the feature is an aperture of a gas turbine engine.

4. The computer-implemented method as claimed in claim 1, wherein the modelling attributes further include one or more of: the movement attributes; physical attributes; and mesh attributes.

5. The computer-implemented method as claimed in claim 1, wherein the one or more modelling attributes are assigned to the generated mesh.

6. The computer-implemented method as claimed in claim 1, wherein the one or more modelling attributes are assigned prior to the generation of the mesh.

7. The computer-implemented method as claimed in claim 1, wherein the one or more modelling attributes are assigned automatically without user intervention.

8. The computer-implemented method as claimed in claim 1, further comprising: editing a data entity of the set of data entities to change the geometrical shape of a feature; generating a further mesh for the feature using the edited data entity; changing one or more modelling attributes associated with the changed geometrical shape; and assigning the changed one or more modelling attributes to the further mesh.

9. The computer-implemented method as claimed in claim 1, further comprising assembling a model of at least a part of the gas turbine engine, the model including the generated mesh and the assigned one or more modelling attributes.

10. A non-transitory computer readable storage medium comprising computer readable instructions that, when read by a computer, causes performance of the method as claimed in claim 1.

11. An apparatus for modelling at least a part of a gas turbine engine, the apparatus comprising:
a memory that stores a data structure; and
a computer programmed to:
generate a mesh for a feature using at least one data entity of the data structure, the at least one data entity defining a geometrical shape of the feature,
wherein the data structure comprises: a set of data entities defining geometrical shapes of features; and modelling attributes associated with the geometrical shapes of the features;
assign one or more modelling attributes using the modelling attributes associated with the geometrical shapes of the features, wherein
the modelling attributes include movement attributes that define whether the surface of a feature is moveable relative to a frame of reference of the gas turbine engine and at what velocities the surface may move, and
a plurality of data entities of the at least one data entity is arranged in a tree structure having parent and child relationships, such that a data entity for features located at a root of the tree structure constitutes a parent, and a data entity for features branching from the root constitutes a child of the parent, the parent and child having related features; and
apply all modelling attributes equally to the parent and child having the related features unless the modelling attributes are not applicable to the child having the related features or are overridden by corresponding modelling attributes.

12. The apparatus as claimed in claim 11, wherein the feature is a physical feature of a gas turbine engine.

13. The apparatus as claimed in claim 11, wherein the feature is an aperture of a gas turbine engine.

14. The apparatus as claimed in claim 11, wherein the modelling attributes include one or more of: the movement attributes; physical attributes; and mesh attributes.

15. The apparatus as claimed in claim 11, wherein the one or more modelling attributes are assigned to the generated mesh.

16. The apparatus as claimed in claim 11, wherein the one or more modelling attributes are assigned prior to the generation of the mesh.

17. The apparatus as claimed in claim 11, wherein the one or more modelling attributes are assigned automatically without user intervention.

18. The apparatus as claimed in claim 11, wherein the computer is further programmed to: edit a data entity of the set of data entities to change the geometrical shape of a feature; generate a further mesh for the feature using the edited data entity; change one or more modelling attributes associated with the changed geometrical shape; and assign the changed one or more modelling attributes to the further mesh.

19. The apparatus as claimed in claim 11, wherein the computer is further programmed to assemble a model of at least a part of the gas turbine engine, the model including the generated mesh and the assigned one or more modelling attributes.

* * * * *